July 21, 1959  K. T. SNOW  2,895,590
RETRACTABLE FINGER AUGER FOR HARVESTERS
Filed Jan. 21, 1954
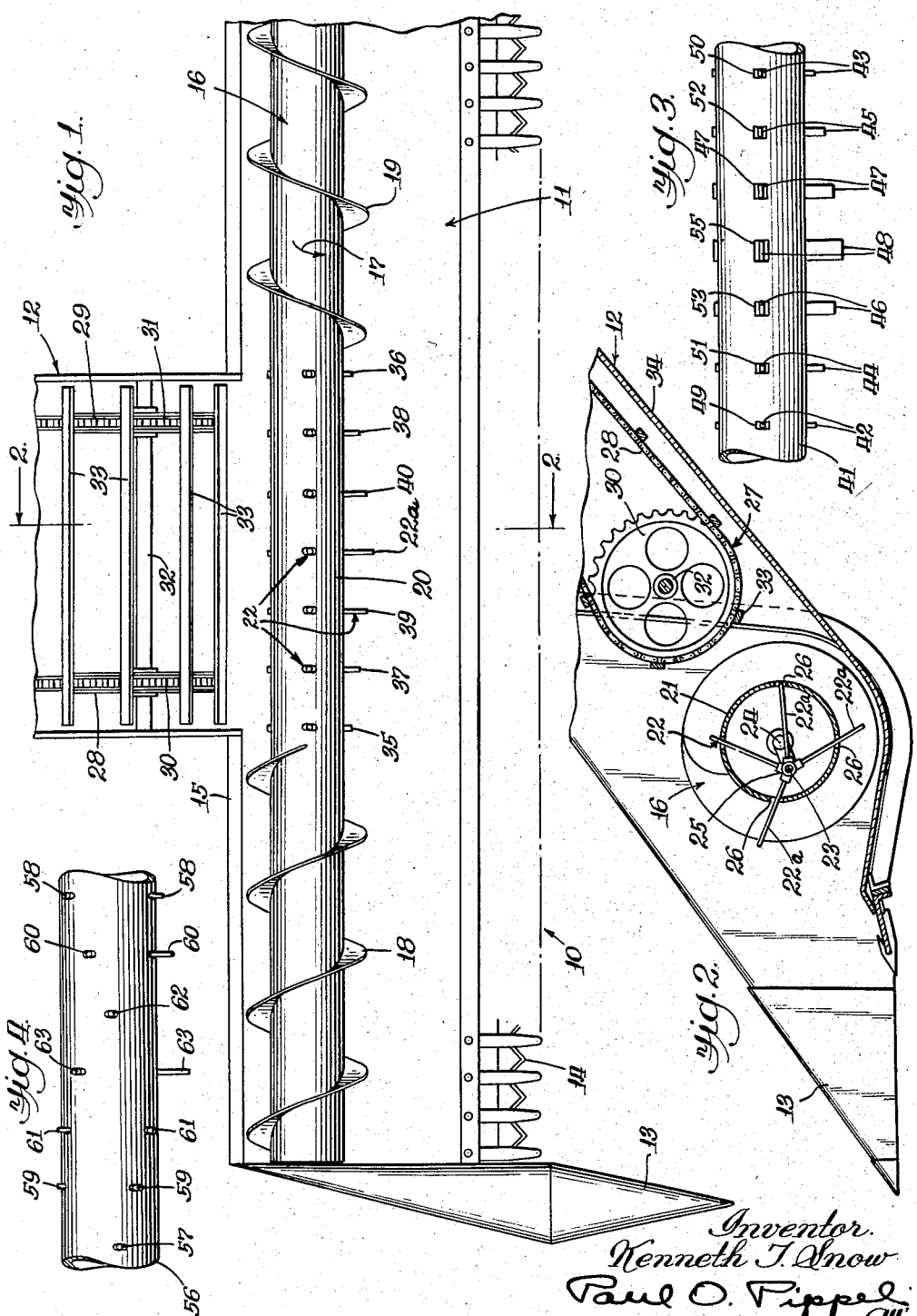
Inventor.
Kenneth T. Snow
Paul O. Pippel
Atty.

United States Patent Office 2,895,590
Patented July 21, 1959

2,895,590

RETRACTABLE FINGER AUGER FOR HARVESTERS

Kenneth T. Snow, Oak Park, Ill., assignor to International Harvester Company, a corporation of New Jersey Application January 21, 1954, Serial No. 405,294

2 Claims. (Cl. 198—104)

This invention relates to a new and improved retractable finger auger for harvesters.

The harvesting portion of a combine includes a platform disposed across the front of the machine and arranged to either cut or pick up previously cut grain and by some conveying means deliver the grain so harvested to the threshing and separating mechanisms which are positioned behind the platform. Many conveying means have been employed on combine platforms in an effort to produce a uniform and free flowing of harvested material to the threshing mechanism. The principal form of conveyor mechanism has recently been of the auger type wherein oppositely disposed screw flight are arranged at the outer ends of an auger tube in such a manner that material is fed inwardly from each end of the auger to a central location disposed intermediate the ends of the relatively wide harvester platform. Another feature which has been found to be relatively important to the successful transition of movement of material from a direction crosswise of the platform to a direction longitudinally rearwardly into a feeder conveyor leading to the threshing mechanism is the employment of a plurality of retractable fingers located in the intermediate section of the auger conveyor tube between the oppositely disposed screw flight on each end of the auger. This construction is shown in the patent to Oehler, 2,529,180, dated November 7, 1950.

It is, therefore, a principal object of this invention to provide an auger conveyor for harvester platforms wherein oppositely disposed screw flight are arranged and constructed to feed harvested grain to an intermediate portion of the platform whereafter retractable fingers in the intermediate portion of the auger tube are arranged to receive grain fed laterally of the platform by the screw flight and thereafter deliver that grain in a rearward direction at right angles to its previous direction of movement and into a thresher feeding conveyor.

An important object of this invention is the provision of means in a combine of the type having a relatively wide harvesting platform and a relatively narrow feeder conveyor leading rearwardly from this wide forwardly disposed platform and the platform having thereon an auger conveyor with screw flight at the outer ends thereof and retractable fingers in front of the feeder conveyor, and the fingers being of such construction to permit some continued lateral movement of the grain toward the center of the feeder conveyor and yet simultaneously direct harvested grain rearwardly into the grasp of the feeder conveyor.

A still further important object of this invention is to supply the retractable finger section of a harvester platform auger with fingers of gradually increasing length from the outer ends to the center thereof.

A further important object of this invention is to provide the retractable finger portion of a harvester platform auger with fingers of gradually increasing width from the outer ends to the center thereof.

Another and still further important object of this invention is to equip a retractable finger auger for harvesters with fingers of gradually increasing length from the outer ends to the center thereof and simultaneously the fingers being of gradually increasing width from the outer ends to the center thereof to accomplish the function of permitting harvested grain to be moved laterally inwardly of the retractable finger portion of a combine auger and yet have positive means at the center thereof for re-directing the movement of grain rearwardly into a receiving feeder conveyor.

Another important object of this invention is to provide a retractable finger auger conveyor for combines with fingers of varying lengths and arranged in a spiral pattern around the auger conveyor tube in such a manner that grain being fed laterally by the auger conveyor will not be abruptly halted immediately upon reaching the outer extremities of the retractable finger section of the auger conveyor.

Other and further important objects and advantages of this invention will become apparent from the disclosures in the following specification and accompanying drawing.

In the drawing:

Fig. 1 is a top plan view of the device of this invention.

Fig. 2 is a sectional view taken on the line 2—2 of Fig. 1.

Fig. 3 is a top plan fragmentary detail of a modified form of retractable finger auger conveyor.

Fig. 4 is a top plan fragmentary detail of a still further modified form of retractable finger section of an auger conveyor.

As shown in the drawing the reference numeral 10 indicates generally a harvester portion of an agricultural implement such as a combine wherein grain is harvested and subsequently threshed on the same machine. This harvesting portion 10 includes a relatively wide grain-receiving platform 11 and a relatively narrow platform discharge or feeder housing 12 disposed at the rear thereof for the purpose of delivering the harvested grain to the threshing and separating elements of the machine which are disposed rearwardly thereof. The platform 11 has forwardly disposed grain dividers 13 at the outer end thereof (one of these has been broken away in order to show the platform in a larger scale). The grain dividers 13 are adapted to penetrate into the standing and down grain in such a manner that a path is defined for the harvester and the grain to be cut and treated is more clearly defined. All of the grain inwardly of the spaced dividers 13 is adapted to be severed from its roots by means of a reciprocating sickle 14 extending across the forward edge of the platform 11 between the spaced dividers. Grain so cut is deposited rearwardly onto the surface of the platform 11 across the full width thereof.

The platform 11 is further provided with a back wall 15 and a transversely disposed auger conveyor 16 between the end dividers 13. The auger conveyor 16 is journalled within the dividers 13 and means (not shown) are provided for rotatably driving the auger conveyor in a direction indicated by the arrow 17. This auger conveyor extending the full width of the platform is provided with a screw flight 18 on one end and an oppositely pitched screw flight 19 on the other end. The oppositely pitched screw flight 18 and 19 and the rotation of the auger 16 in the direction of the arrow 17 cause all grain material which is deposited onto the surface of the platform in front of the flight sections 18 and 19 to be conveyed laterally of the platform toward the center defined by the feeder housing 12 which is relatively narrow and located substantially at the center of the platform.

The central section of the auger conveyor 16 designated 20 and defined by the outer limits of the narrow feeder housing 12 is equipped with retractable fingers such as shown in the previously mentioned Oehler Patent 2,529,180. This center or intermediate section 20 of the auger conveyor 16 must accomplish the dual function of receiving grain directly thereon from the sickle 14 and feeding that grain rearwardly into the feeder housing 12 and of simultaneously receiving grain approaching it in a lateral direction from each of the screw flights 18 and 19 and thence moving that grain rearwardly along with the grain deposited directly thereon into the feeder housing 12.

As best shown in Fig. 2 the auger conveyor 16 has a tubular core or drum 21 for carrying the screw flight 18 and 19 and providing the surface from which the fingers in the center section are extended and retracted. The radially extending retractable fingers are shown generally by the numeral 22. These fingers are carried on a stationary shaft 23 which is offset in the manner of a crank or eccentric from a main auger shaft 24 which is concentric with the tube 21 in the form of the device as shown in Figs. 1 and 2. Four fingers are located at each mounting on this eccentric or crankshaft 23 as shown at the swivel mounting 25. Thus as the tube 21 of the auger conveyor 16 is rotated about the stationary eccentric shaft 23 the fingers 22 will be extended a greater or lesser extent from the surface of the tube 21 depending upon the position of the fingers 22 with respect to the platform. The fingers 22 project outwardly through bearing apertures 26 in the tube 21. It will be seen that the fingers 22 are extended in a generally radial direction their maximum distance as they approach the forward edge of the platform and as they sweep beneath the auger conveyor 16 they are withdrawn so that at the rear of the auger conveyor they are completely retracted within the housing 21 whereupon the grain is positively released and may be received and taken by an undershot feeder conveyor 27 disposed within the feeder housing 12. The device of Figs. 1 and 2 show the fingers in aligned transverse rows.

The undershot conveyor 27 includes spaced apart chains 28 and 29 which are mounted at their forward lower ends on spaced sprockets 30 and 31 which are in turn carried on a shaft 32 journally mounted within the side walls of the feeder housing 12. The chains 28 and 29 are joined by regularly spaced apart cross slats 33. As best shown in Fig. 2 the cross slats 33 of the feeder conveyor 27 are arranged to pick up the grain fed rearwardly of the auger conveyor by the retractable fingers and thereupon deliver the grain upwardly on the inclined pan 34 comprising the bottom of the feeder housing 12.

The feature of the present invention which appears to be novel is the construction of the retractable fingers in such a manner that the transition of flow of material from a direction laterally of the platform to a direction longitudinally of the platform is occasioned smoothly and in such a manner that the grain is delivered to the feeder conveyor 27 substantially evenly across its full but narrow width. This is accomplished by varying the lengths of the retractable fingers 22. However, all of the fingers on any one swivel point 25 are preferably the same length. The device of Fig. 2 which is the center of the retractable finger portion of the auger shows the longest retractable finger. The fingers gradually diminish in length from this central position laterally outwardly of the auger tube 21 to a position adjacent the spaced apart sides of the feeder housing 12. Thus the retractable fingers which initially receive material from the oppositely pitched screw flights 18 and 19 are relatively short in length as shown in Fig. 1 at 35 and 36. These fingers now have attained their maximum extension and thus do not provide a sudden block to the continued lateral movement of a susbtantial portion of the grain being moved by the screw flights 18 and 19 centrally of the auger conveyor 16. If the fingers 35 and 36 had the length of the central fingers designated 22a they would immediately dam up the flow of material so there could not be an even flow of harvested grain to and throughout the width of the undershot feeder conveyor 27. Thus the next inward retractable fingers 37 and 38 are somewhat longer than the outer fingers 35 and 36 and yet shorter than the central fingers 22a similarly as the fingers 39 and 40 are longer than the fingers 37 and 38 and yet slightly shorter than the central fingers 22a. It is thus obvious that this gradually increasing length of retractable fingers commencing with the inner edges of the opposed screw flights 18 and 19 to the central retractable fingers 22 permits the simultaneous urging of material rearwardly and laterally in such a manner that the grain is delivered to the undershot feeder conveyor 27 relatively uniformly across its entire width.

In the modified structure of the device as shown in Fig. 3 the retractable fingers, not shown, increase in length as they progress toward the auger conveyor 16 but they also increase in width from the outer ends to the center so that by the time the grain reaches the center of the conveyor the material is gradually paddled rearwardly into the feeder conveyor. As shown in Fig. 3 the auger conveyor drum or core 41 is provided with outer short narrow fingers 42 and 43. From this point inwardly the retractable fingers increase both in length and width. Thus, fingers 44 and 45 are slightly longer and wider than the fingers 42 and 43. Similarly fingers 46 and 47 are wider and longer than the fingers 44 and 45, and a central finger 48 is still longer and wider than the fingers 46 and 47. Inasmuch as the fingers increase in width in order to obtain greater paddle effect at the center of the retractable finger portion of the auger the bearing apertures in the drum 41 must also vary in size. Thus apertures 49 and 50 through which the fingers 42 and 43 respectively pass are of a size to accommodate these relatively narrow fingers. Similarly apertures 51 and 52 for the fingers 44 and 45 respectively are somewhat wider to receive the somewhat wider fingers and still further the apertures 53 and 54 for the fingers 46 and 47 are correspondingly wider. Finally the aperture 55 for the central retractable finger paddle 48 has the full width and easily accommodates this wide paddle-like finger.

It is thus apparent that as the grain is moved laterally inwardly toward the center of the auger conveyor it is gripped more firmly and positively so that the turning of the grain at right angles is completely accomplished by the time the grain reaches the middle of the auger and yet it should be understood that all of the grain does not actually reach the center of the auger but rather a substantial portion is fed rearwardly into the feeder conveyor in gradually increasing amounts so that a relatively uniform mat of grain is fed to the feeder conveyor across the full width thereof. This, of course, contributes to more efficient threshing and separating of grain from the straw.

Fig. 4 shows a further modified form of the invention wherein the retractable fingers are arranged in a spiral pattern around the auger drum in more or less continuations of the opposed spiral flight such as 18 and 19. Only the central portion of an auger conveyor drum 56 is shown wherein a plurality of retractable fingers are arranged in spiral paths therearound. However, here again the outermost fingers adjacent the inwardly feeding spiral flights are relatively short in length so that even when they are fully extended they do not present a complete barrier to the harvested material fed transversely of the harvesting platform. As shown the retractable fingers 57 and 58 at the outermost extremities are the shortest fingers and the fingers gradually increase in length as they progress inwardly toward the auger conveyor. The fingers 59 and 60 are slightly longer than the fingers 57 and 58 and the fingers 61 and 62 are still longer. The central fingers 63 have the maximum length thus guaranteeing the final movement of grain into the scope of a feeder conveyor.

It is believed that herein is provided a retractable finger auger conveyor for harvesters such as combines wherein the variable lengths of the retractable fingers from a relatively low point, at each outer extremity of the intermediate area of the auger conveyor having the retractable fingers, to a maximum length at the center. The variable length retractable fingers contribute to the desirable and effective flow of harvested material from the receiving platform to the feeder conveyor and ultimately to threshing and separating mechanisms. Obviously certain details of construction may be varied without departing from the principles disclosed herein and I, therefore, do not propose limiting the patent granted hereon otherwise than as necessitated by the appended claims.

What is claimed is:

1. In a retractable finger auger for harvester platforms comprising an auger drum across the width of the platform, opposed spiral flight on said drum feeding to a discharge portion of the platform, retractable fingers located in an intermediate section of the drum adjacent the discharge portion of the platform, said retractable fingers increasing in length from minimum length outside fingers adjacent the discharge endings of the opposed spiral flight to maximum length fingers at the center of said intermediate section, said retractable fingers increasing in width as they increase in length.

2. An auger conveyor for harvester platforms comprising a straight through auger core, oppositely pitched screw flight on said auger core arranged and constructed to feed material to an intermediate portion of said core, fingers extending and retracting from the intermediate portion of said core, and said fingers increasing in width from narrow outside fingers adjacent the endings of the oppositely pitched screw flight to relatively broad fingers at the center of said intermediate portion.

References Cited in the file of this patent

UNITED STATES PATENTS

| | | |
|---|---|---|
| 796,268 | Troeger | Aug. 1, 1905 |
| 2,608,283 | Oehler | Aug. 26, 1952 |
| 2,612,980 | Oehler | Oct. 7, 1952 |